United States Patent [19]

Hayashida

[11] Patent Number: 4,990,936
[45] Date of Patent: Feb. 5, 1991

[54] IMAGE FORMING DEVICE
[75] Inventor: Nobuyuki Hayashida, Hachioji, Japan
[73] Assignee: Fujitsu Limited, Kawasaki, Japan
[21] Appl. No.: 357,813
[22] Filed: May 30, 1989
[30] Foreign Application Priority Data
May 30, 1988 [JP] Japan ................................. 63-131929
[51] Int. Cl.⁵ ...................... G01D 15/24; G01D 15/14
[52] U.S. Cl. ................................. 346/134; 346/107 R; 346/160
[58] Field of Search .................. 358/296, 300, 302; 346/134, 136, 108, 160, 107 R; 355/308, 309

[56] References Cited
U.S. PATENT DOCUMENTS
4,581,618 4/1986 Watanabe ............................ 346/134

FOREIGN PATENT DOCUMENTS
55-93478 7/1980 Japan.
60-145768 8/1985 Japan.

Primary Examiner—Benjamin R. Fuller
Assistant Examiner—Scott A. Rogers
Attorney, Agent, or Firm—Staas & Halsey

[57] ABSTRACT

This invention relates to an image forming device such as an LED printer, a liquid crystal printer, laser printer or the like, and the object of this invention is to provide an image forming device having a small size and low production cost, wherein the image forming device comprises a sheet feeding unit, a sheet carrier, a pulse motor provided for the sheet carrier 2 and driven to carry a sheet fed from the sheet feeding unit to a printer, a motor controller for controlling the stepping motion of the pulse motor for moving the sheet, a printer 16 for printing an image over at least one entire line of a sheet, and which is perpendicular to the direction in which the sheet is carried, by one printing operation thereof, and a printing controller for controlling the printing operation of the printer in such a way that each printing operation thereof is synchronized with the stepping motion of the pulse motor 12, and an outlet tray 24 for receiving the printed sheet.

7 Claims, 8 Drawing Sheets

IMAGE FORMING DEVICE

BACKGROUND OF THE INVENTION

1. Field of the Invention

This invention relates to an image forming device such as an LED printer, liquid crystal printer, laser printer or the like.

In this field, the printing operation of the printers mentioned above utilizes an electrophotographic recording system, and therefore, a printing operation giving high quality printed characters can be quietly carried out at a high speed.

2. Description of the Related Art

A direct current motor (DC motor) is usually used as a main motor for driving all the devices in the printer, including devices for carrying of the sheets.

The sheets are usually carried at a constant speed, and in a printing portion comprising an electrophotographic recording system, the writing of an image on a drum, referred to as a main scanning operation, is carried out in synchronization with the movement of the sheet. Accordingly, the DC motor is usually controlled at a constant speed and the rotational position of the DC motor is detected by a rotary encoder or the like, to synchronize the movement of the sheet and the writing of an image on a drum.

In the conventional system, however, since the DC motor is used as a main motor, and further since, the motor is controlled to a predetermined constant speed for synchronizing the writing of an image on a drum with the movement of the sheet, the size of the printer per se is large and the construction of the control circuit is complicated, thus increasing the production cost thereof.

SUMMARY OF THE INVENTION

This invention is intended to overcome the drawbacks of the conventional system, and therefore, an object of present invention is to provide an image forming device having a small size and low production cost.

Therefore, according to the present invention, there is provided an image forming device which comprises an image bearing member, an image forming means for forming an image on said image bearing member and provided with a plurality of dot registering devices arranged in one line, each being driven in response to a video signal supplied thereto, a pulse motor for driving said image bearing member, a motor controller for controlling said pulse motor in accordance with a pulse supplied thereto, and a means for generating a video signal requiring signal for causing a video signal to be supplied to said image forming means every time a predetermined number of pulses are supplied thereto.

The image forming device according to this invention is characterized in that the pulse motor is used for carrying the sheet, the printing operation for printing an image on at least one horizontal line of the sheet is synchronized with the movement of the sheet.

DESCRIPTION OF THE PREFERRED EMBODIMENTS

Figure 1:
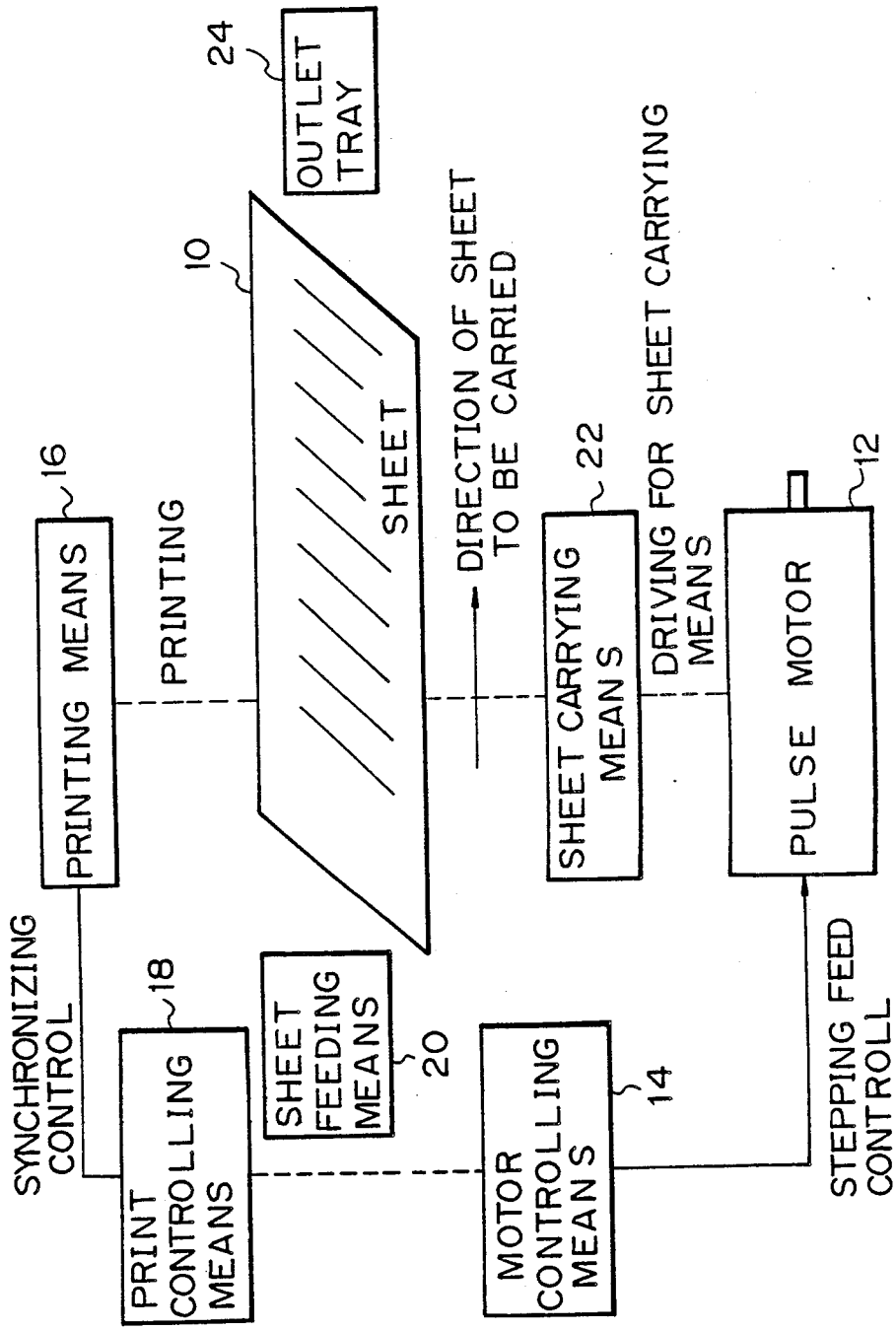
FIG. 1 is a schematic diagram illustrating a preferred embodiment of the present invention.

The preferred embodiments of this invention will be explained in more detail with reference to the attached drawings. As explained above, the image forming device of this invention includes an image printing device used for a copying machine and a printer used for a computer, a facsimile, or the like. Accordingly, the printing means used in this invention is not restricted to a specific printing means and any printing means, for example, an electrostatic recording system, an electrophotographic recording system, and a thermal transfer recording system or the like, can be used. Preferably, however, an electrophotographic recording system is used as the printing system in this invention.

The sheet used in this image forming device to be printed thereon may be made of any material on which images can be printed, for example, a paper sheet or a film. Also, the sheet may be supplied to the image forming device in the form of a cut sheet or as a continuous sheet. In the former case, the cut-sheet may be supplied from a suitable cassette or container having the cut sheets stacked, therein the latter case, the sheet may be supplied in the form of a rolled continuous sheet.

As explained above, in the image forming device of this invention, a pulse motor is used as a feeding means for an image bearing member such as a recording paper, photosensitive drum or the like, and a registering device array is used in which a plurality of registering devices for registering image information in dotted form respectively therein, are arranged in a line.

Further, in this image forming device, a print controller is provided. The controller is connected to a means for transferring the information to be registered in a coded form, and in a mixed form of the image information, i.e., dotted pattern information and the coded information thereto. The controller includes a processor for performing the process of receiving the coded information and the image information and storing the same in a memory explained below, after developing them into dotted pattern information, and an image memory for storing the dotted pattern information. Moreover, a mechanical controller is provided for generating a horizontal synchronizing signal for the print controller and for receiving the dotted pattern information corresponding to that of one line in the image memory. The mechanical controller also provides the dotted pattern information to the registering device array.

In the image forming device of this invention, the horizontal synchronizing signal is output by the print controller at every predetermined step movement of the pulse motor, to receive the registered information to be provided to the registering device array.

Accordingly, in this device, an additional circuit is not required, and thus the circuit construction thereof is simplified.

Further, the print controller can be formed regardless of the construction of an engine controller as a mechanical controller. Accordingly, the print controller can be handled as the same means as that which outputs the horizontal synchronizing signal, such as a laser printer.

In this invention, the sheet is carried along a sheet carrying passage by sheet carrying means 22 which comprises a plurality of sets of sheet feeding or sheet delivering rollers which are preferably driven by one main motor rotated intermittently through a fine rotating angle for each increment of rotation. Accordingly, in this invention, a pulse motor 12 which can rotate in steps under the control of a suitable controller can be used as the main motor.

The printing system used in this invention is not restricted to a specific printing system, but preferably the printing system of this invention uses a printing method whereby a printing operation is performed along one horizontal line in the widthwise direction of a sheet and perpendicular to the vertical direction corresponding to the direction in which the sheet is moved, and is carried out from one end of at least one line to the opposite end thereof in one printing operation movement. Further, in this invention, the printing operation movement for printing images on the sheet, as described above, is preferably performed in a short time, and more preferably, is performed instantly upon receiving a signal to start the printing operation on at least one line.

Accordingly, in this invention, when one printing operation is finished, i.e., at least one line is printed on the sheet, the sheet is moved slightly in the sheet moving direction by a stepping movement of the pulse motor 12, under the control of a print controller, and the printing operation is repeated.

Namely, in this invention as explained above, the print control means 18 controls the printing operation of the printing means 16 in such a way that each printing operation thereof is synchronized with the stepping motion of the pulse motor. The method of this printing system is exemplified in FIG. 8, which shows the images printed along the three horizontal lines 801, 802, and 803 of the sheet 200 intermittently moved in the transfer direction T.

Figure 8:
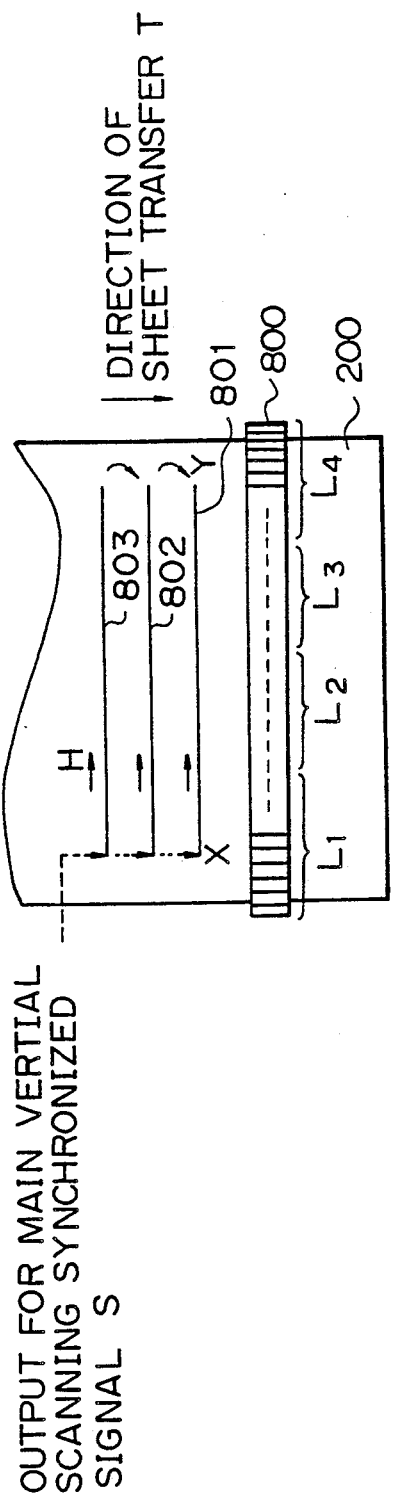
FIG. 8 is a schematic diagram of the printing operation of this invention.

In FIG. 8, when the sheet 200 is moved in the printing means 800 by a stepping movement of the pulse motor 12, in accordance with a transverse synchronizing signal S, then the printing means 800 instantly prints the images on the horizontal line 801 from the one end X thereof to the other end Y thereof, as indicated by an arrow.

When one printing operation is finished, then the next transverse synchronizing signal S is output, and thus the sheet is moved a predetermined distance to allow the next printing operation on the line 802 in the same way as described above.

In this invention, the printing system by which a plurality of lines are simultaneously printed in one printing operation also can be adopted.

Moreover, in this invention, the printing operation can be performed directly onto a sheet, or can be performed in such a way that images to be printed on a sheet are first formed on an image bearing member such as a photosensitive drum or the like and the images carried on the surface of the image carrying means are then transferred to the sheet by any suitable means.

With respect to this method, the electrophotographic recording system is preferably used in this invention, but in the embodiments described hereafter, a dot registering device array i.e., an LED array system, is preferably used.

A specific embodiment of this invention will be explained with reference to the attached drawings.

Figure 2:
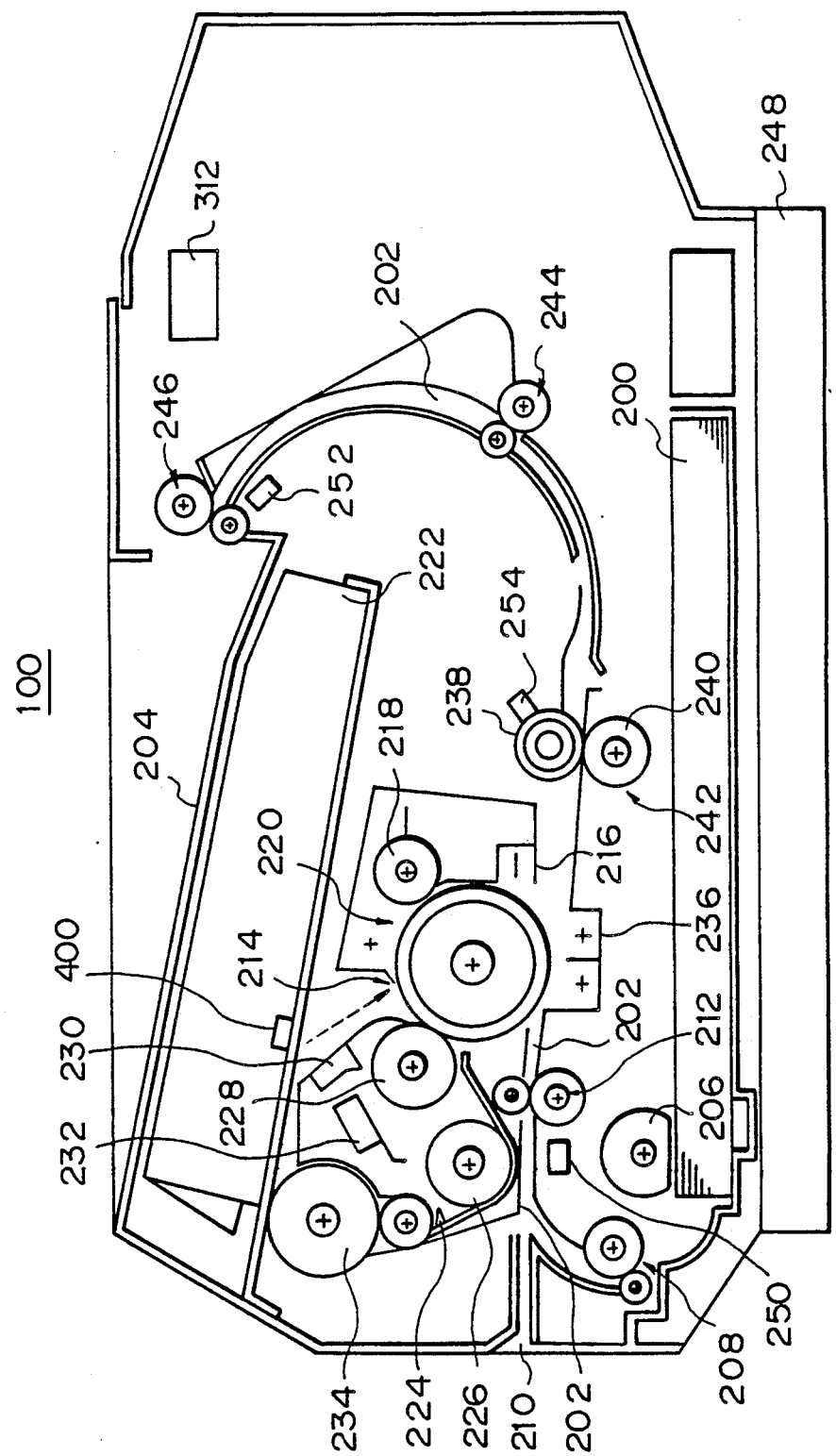
FIG. 2 is a cross sectional view showing the interior of one example of an LED printer according to the invention.

In FIG. 2, the cut sheets 200, for example, a paper sheet or a film or the like, are stacked on the inner bottom portion of the LED (Light Emitting Diode) printer 100 and contained in a cassette or the like. The cut sheets 200 are picked up by a pick-up roller 206, one by one from the top of the stack of sheets in the cassette, and fed into a cut sheet carrying passage 202 having curved portions to form an S-shaped configuration, and provided inside of the LED printer 100 for carrying the cut sheets to an outlet sheet tray 204, i.e., a stacker provided at an upper portion of the LED printer 100.

The cut sheets picked up by the pick-up roller 206 are carried into the sheet carrying passage 202 by a feed roller 208. Alternatively, the cut sheets 200 can be inserted into the sheet carrying passage 202 through a sheet inlet 210 provided on the side wall of the LED printer 100, as shown on the left hand side of FIG. 2.

In the sheet carrying passage 202, a roller 212 is provided downstream of the roller 208 and the cut sheet inlet 210, whereby cut sheets picked up from the cassette or inserted at the cut-sheet inlet 210 can be carried to the lower portion of a photosensitive drum 214 along the sheet carrying passage 202.

The photosensitive drum 214 is the main element of the printing means of this invention, and consists of a cylindrical member having a photosensitive film material coated on the outer surface thereof, and associated devices such as an image writing device, a developing device, a transfer device, a discharge device, and a precharging device, arranged in close contact with the surface thereof and encircling the drum 214.

The surface of the photosensitive drum 214 is discharged by the discharge device 216 after the toner is transferred, and thereafter, is cleaned by the cleaner 218 and again charged by the precharging device 220.

At this stage, the surface of the drum is given an electrical potential of, for example, $-600$ V, by the precharging device 220.

Further, after the precharging operation is carried out, an image is formed on the surface of the drum 214 in such a way that a light emitted from the LED array 400, in which a plurality of LED's are arranged in a line, provided in a drum writing unit 222 and arranged in parallel to the axial direction of the drum, is incident on the surface of the drum 214 to form the latent image thereon, and the latent image is developed in the developing device 224 to form a toner image.

The developing device 224 in this embodiment comprises a paddle roller 226, a developing roller 228, a blade 230, and a flow control plate like toner is supplied from a toner supply device 234.

The toner image thus developed on the photosensitive drum 214 is transferred to a surface of the cut sheet 200 by the transfer device 236.

When the light emitted from the LED array 400 is incident on the surface of the photosensitive drum 214, the electric potential of the point of the surface thereof on which the LED light is incident is made 0 V, i.e., to a natural characteristic of the photosensitive material coated on the surface of the drum 214.

On the other hand, the toner is generally charged at a minus voltage (V) of, for example, about −500 V. Thus when the drum 214 is rotated and the point having the electric potential 0 V is in contact with the developing device 224, the toner is attached to that point to form an image on the drum 214. Further, when the image formed on the surface of the drum 214 is transferred to the cut sheet 200 by transferring the toner image to the surface of the cut sheet 200 an electric potential of about +5 kV as a transfer charge is applied to the surface to the cut sheet 200 to enable transfer of the toner from the drum 214 to the surface of the cut sheet 200.

Then the cut sheet 200 to which the toner image has been transferred is carried to a toner fixing device 242 which includes a heat roller 238 including a halogen lamp 310 (FIG. 3) therein and a pressure roller 240.

After the transferred toner image is fixed on the cut sheet 200 at the toner fixing device 242, the cut-sheet 200 is carried to the outlet sheet tray 204 through feed rollers 244 and 246.

Namely, after the transfer operation is completed, the cut sheet 200 is subjected to a thermal treatment by the heating roller 238 at a temperature of, for example, 190° C., to fix the toner image on the cut sheet 200.

In this embodiment, a section 248 containing a controller 308 for controlling the operation of the devices in this printer is provided on the bottom surface of the LED printer 100, and further, detectors 250 and 252 for detecting the edges of the cut sheet 200 carried in the sheet carrying passage 202 is provided upstream of the roller 212 and roller 246, respectively.

Further, a sensor 254 for detecting the temperature of the heat roller 238 is provided on the heat roller 238 and the temperature of the heat roller 238 is controlled by a signal output from the sensor 254.

Figure 3:
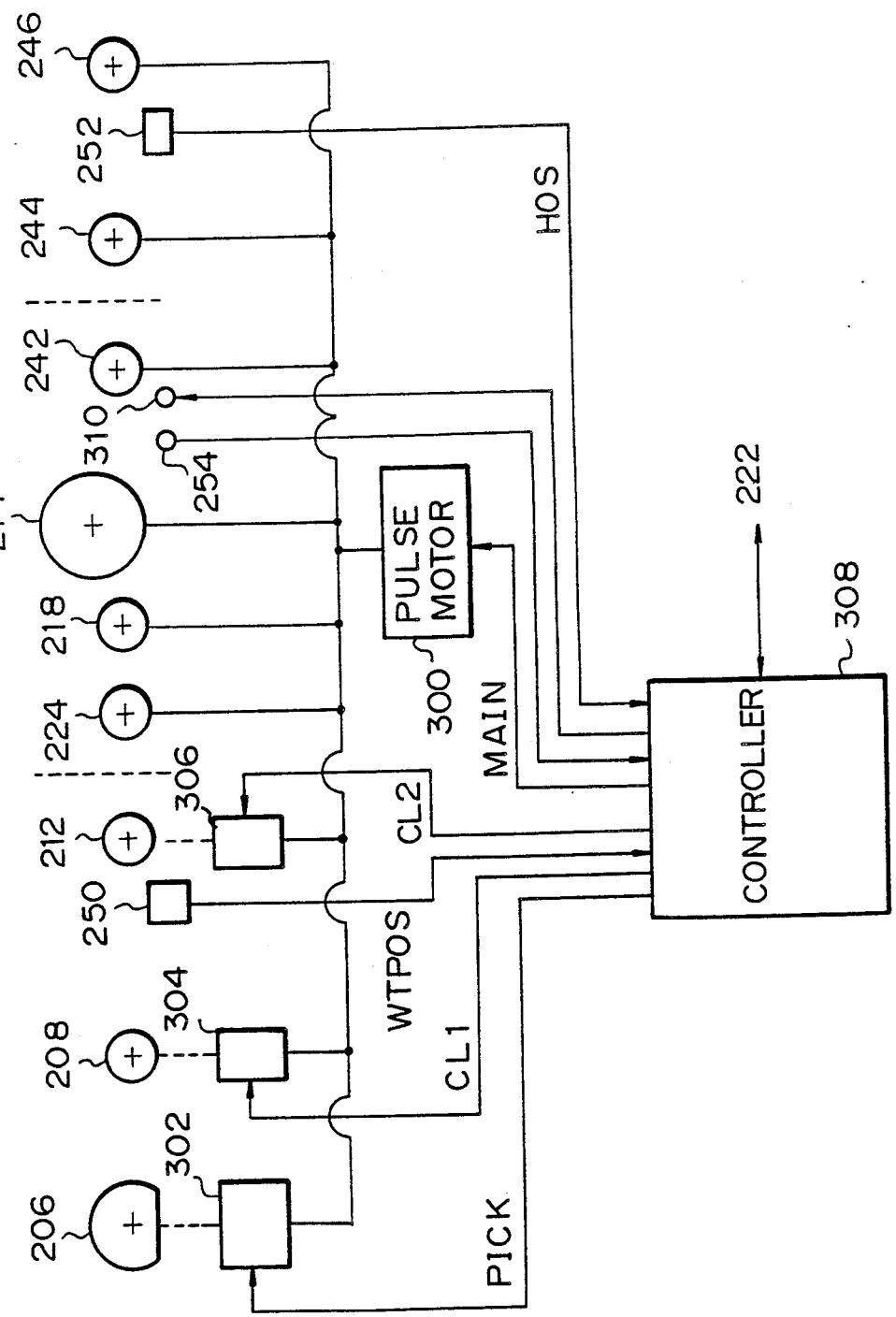
FIG. 3 is a schematic diagram of the control system of the LED printer shown in FIG. 2.

In FIG. 3, the control system of the LED printer of this invention is explained. As is apparent from the FIG. 3, the drive forces required for the operation of the respective devices are provided by a motor 300. Further, each roller 206, 208, and 212 is provided with a clutch 302, 304, and 306, respectively. These rollers, clutches and the motor 300 are controlled by the controller 308 contained in the controller containing section 248. The current flowing to the halogen lamp 310 contained inside the heat roller 238 is also controlled by the controller 308.

In this embodiment a display means 312 which shows time at which an exchange of the toner or the drum unit including the photosensitive drum 214, the developing device 224, the transfer device 236 and the fixing device 242, is also controlled by the controller 308.

Next, the control system of the LED array 400 used in this embodiment will be explained.

Figure 4:
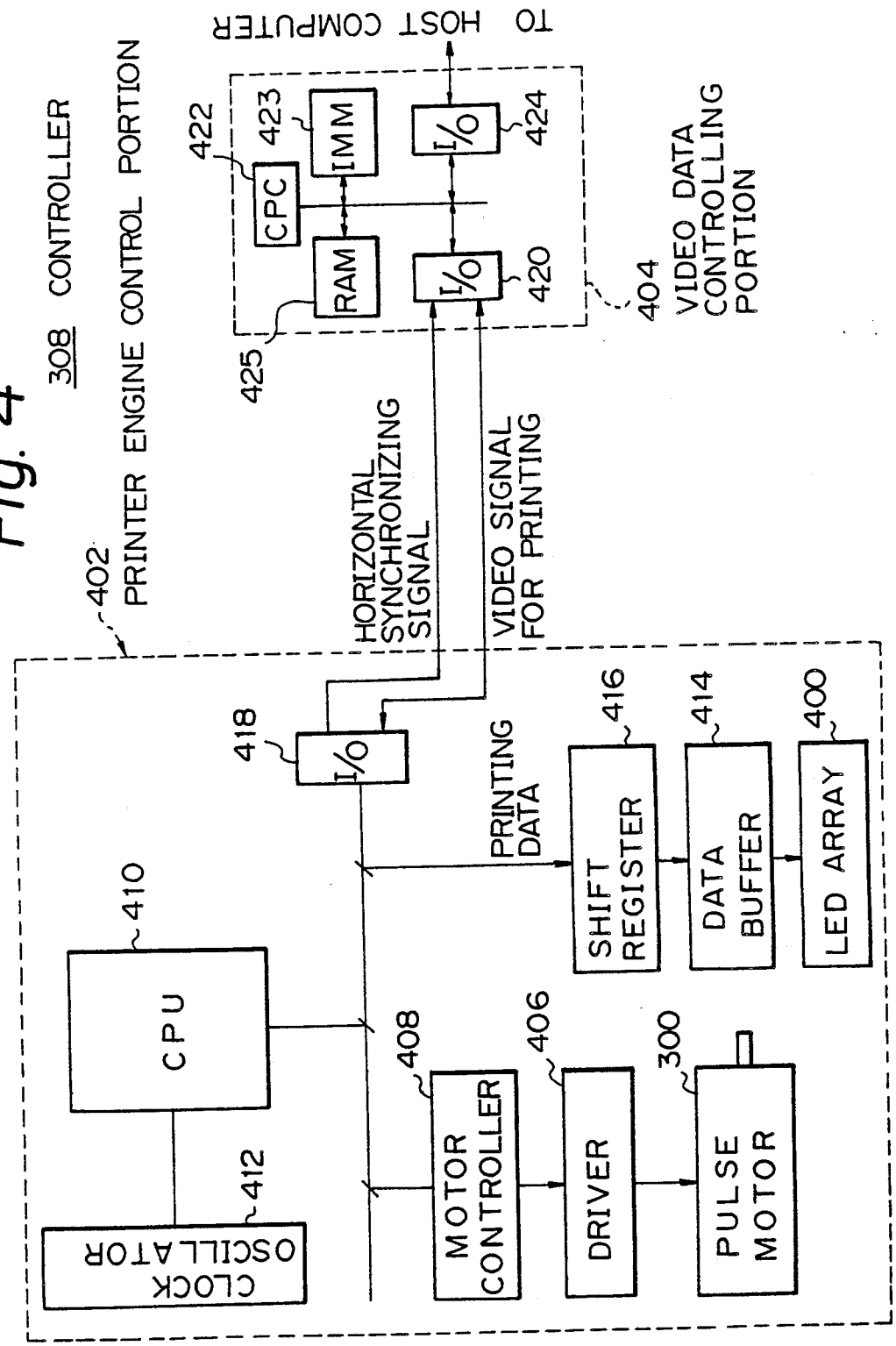
FIG. 4 is a block diagram of the controller shown in FIG. 3.

As shown in FIG. 4, the LED array 400 is controlled by the controller 308 which consists of a printer engine control portion 402 and a video data control portion 404.

The printer engine control portion 402 controls not only the pulse motor 300 but also a processing member including the precharging unit 220 and the transfer device 236, in a predetermined known sequence.

Further, a CPU 422 in the video data control portion 404 receives the character code information and the image information is transferred from a host computer, such as a personal computer or the like, through an I/O interface 424 and stored in a RAM 425.

The CPU 422 transduces the character code information into the dot pattern of the character, utilizing a character generator, and stores this pattern in an image memory IMM 423 in accordance with a printing image, and simultaneously, stores the image information in the image memory IMM 423.

In FIG. 4, a pulse motor 300 is driven by a drive circuit 406 controlled by a motor controller 408. Further, a control command is output to the motor controller 408 from a CPU 410 and a clock pulse is output to the CPU 410 from a clock oscillator 412.

The printing data signals, i.e., video signals, are output to the LED array 400 through the I/O interface 418, a shift register 416 and a data buffer 414 printing data from an I/O interface 420 is stored in the video data control portion 404 in the I/O interface 418.

The I/O interface 420 outputs the printing video signal, which comprises the dotted pattern information read out from the image memory IMM 423 corresponding to one line of the memory, one by one in synchronization with a horizontal synchronizing signal output from the I/O interface 418 under the control of the CPU 422 and further, outputs the horizontal synchronizing signal in synchronization with the pulse motor 300.

Namely, when the CPU 422 has stored the dotted pattern data, for example, the dotted pattern data corresponding to one page in the image memory IMM, a start command is output therefrom to the CPU 410 through the I/O interfaces 420 and 418, and the CPU 410 first clears the counter 502 (FIG. 5) and then causes only the counter 502 (FIG. 5) to count up in synchronization with the clock oscillator 412, to actuate the pulse motor 300.

Then, when a front end of a sheet arrives at the predetermined area and is detected by the sensor 250, the CPU 422 stops the count up of the counter 502 just after the time at which the sheet is attached to the roller 212. The first horizontal synchronizing signal i.e., video signal requiring signal, is then applied to the CPU 422 through the I/O interfaces 418 and 420, whereby the CPU 422 outputs the video signals through the I/O interface 420 and the signals are stored in the shift register 416. In this manner the video signal requiring signal is generated and the video signals to be printed are transferred from the video data control portion 404 to the LED array 400.

Figure 5:
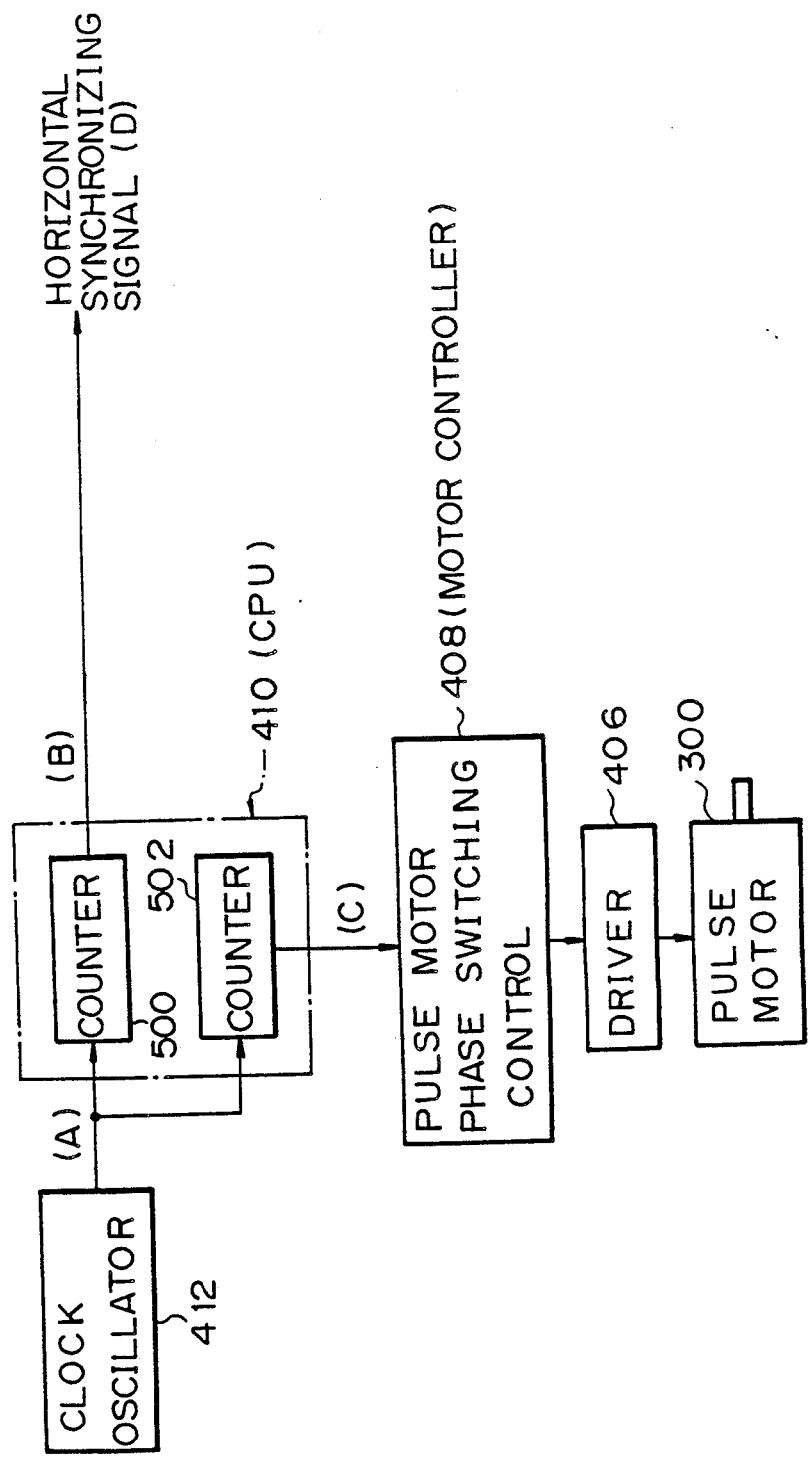
FIG. 5 is a block diagram of an essential portion of the control system used in this invention.
Figure 6:
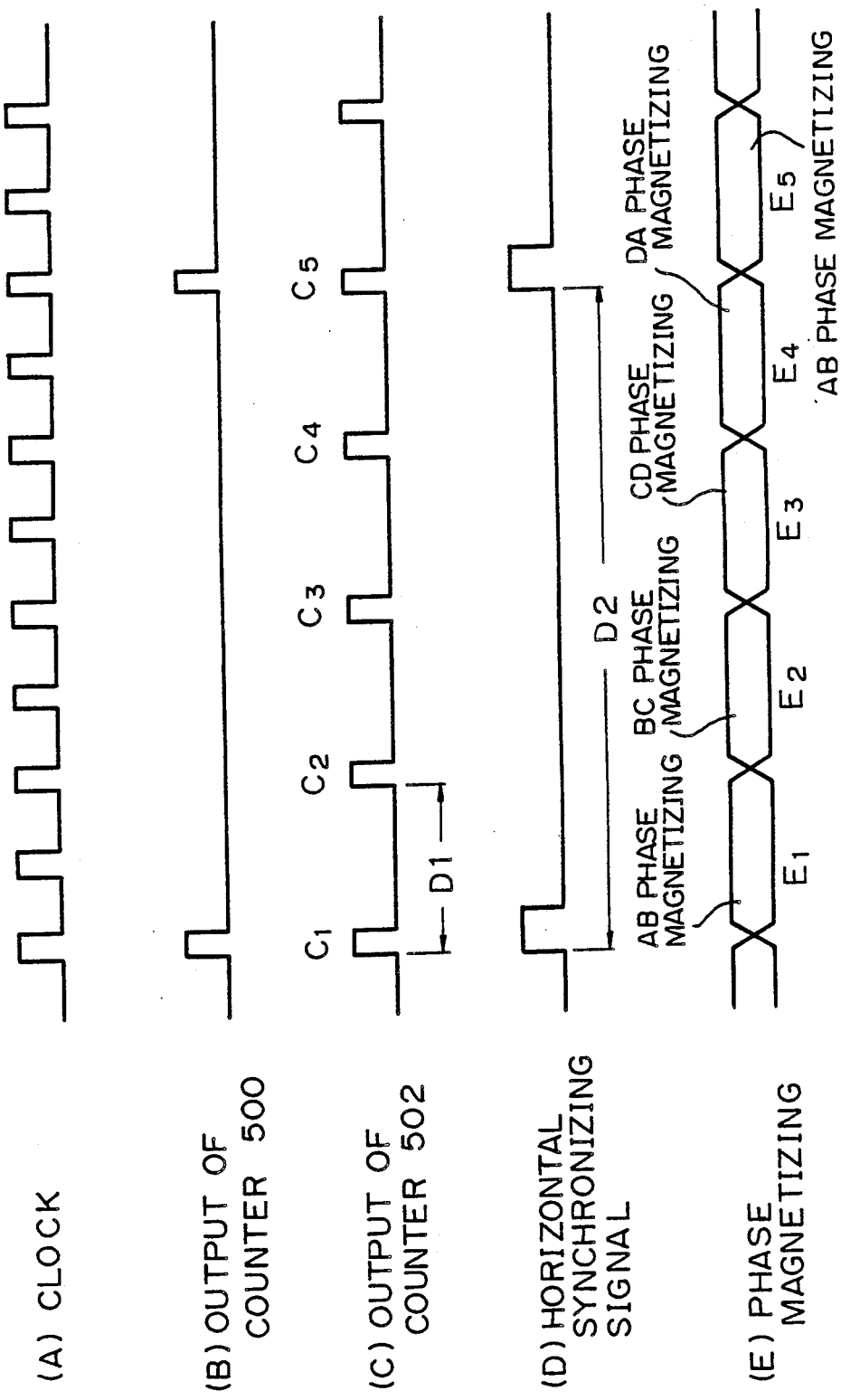
FIG. 6 is a timing chart explaining the operation of the preferred embodiment.

An outline of a the construction this embodiment is given in FIG. 5. In FIG. 5, a clock pulse (A) as shown in FIG. 6 is output from the clock oscillator 412. This clock pulse (A) is output from the clock oscillator 412, and is counted by counters 500 and 502, respectively. The counter 500 outputs a pulse (B) at every eight pulses of clock pulse (A) and the counter 502 outputs a pulse (C) at every two pulses of the clock pulse (A), as shown in FIG. 6 (B) and (C) respectively.

The output signal (B) of the counter 500 is deleted by the CPU 410 and the CPU 410, which outputs the horizontal synchronizing signal (D) as shown in FIG. 6 (D), and thus the horizontal synchronizing signal (D) is obtained by the counter 500.

The output signal (C) is output from the counter 502 to the motor controller 408, and the motor controller 408 controls the pulse motor 300 by switching the phase magnetization as shown in a chart (E) of FIG. 6. In this embodiment, the pulse motor 300 is provided with four magnetic coils A, B, C and D as shown in FIG. 9, and accordingly, the pulse motor has four phases.

When the pulse $C_1$ is output from the counter 502 as shown in (C) of FIG. 6, the coil A and B are simultaneously energized to be magnetized for the period E1. Thus, the axis of the motor M is rotated through a predetermined angle, for example, 90°.

Figure 9:
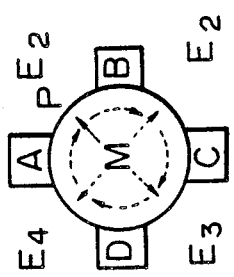
FIG. 9 is a schematic diagram explaining phase magnetizing of the pulse motor.

In FIG. 9, the arrow P indicates the position of the portion of the axis of the motor existing between the coil A and B when a pulse $C_1$ is output.

When the second pulse $C_2$ is output from the counter 502, the coil B and C are magnetized for the period E2. Thus, the axis of the motor M is further rotated by 90°, and therefore, the arrow P will reach a position between the coils B and C. When third pulse $C_3$ is output, the coil C and D are magnetized for the period E3, and thus the axis of the motor M is further rotated by 90°. Therefore, the arrow P will reach a position between the coils C and D, and so on.

Figure 7:
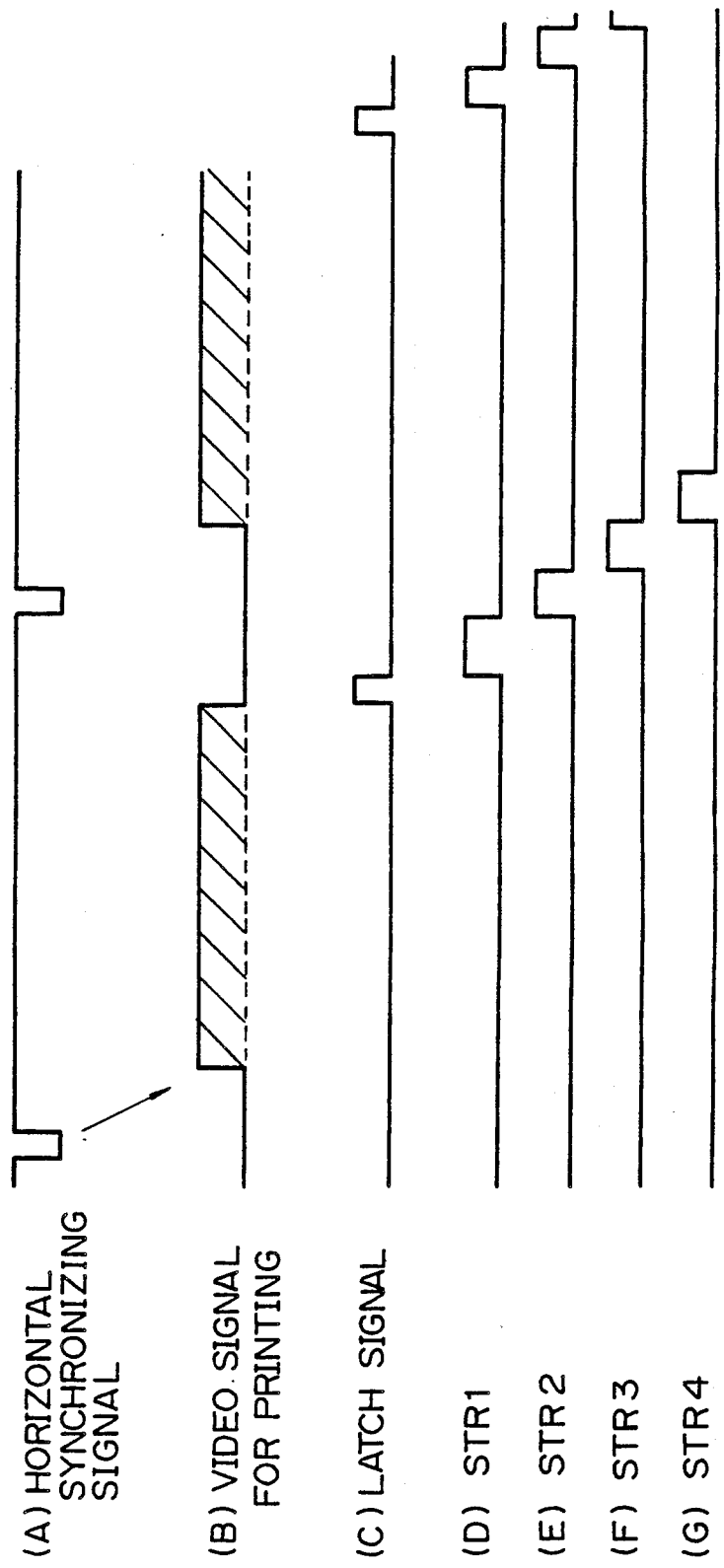
FIG. 7 is a timing chart explaining the formation of the video signal for a printing operation.

The—I/O interface 420 shown in FIG. 4 outputs a print video signal (B), shown in FIG. 7, in accordance with the horizontal synchronizing signal (A), shown in FIG. 7, which corresponds to the signal (D) shown in FIG. 6.

The print video signal contains the data to be printed on the sheet, and this print data is output to a dot registering device array such as the LED array 400 through the shift register 416 and the data buffer 414, to cause a predetermined amount of light to be emitted therefrom, to write the image on the drum 214.

At that time, as explained above with reference to FIG. 8, the vertical main scanning synchronizing signal S is output in synchronization with the timing of the horizontal synchronizing signal, whereby the main transverse scanning of the printing operation can be synchronized with the stepping movement of the pulse motor 300.

As explained above, in accordance with this embodiment, since the pulse motor 300 is used for carrying the sheet, and since the transverse scanning operation for the printing is synchronized with the stepping movement of the pulse motor 300, the print control circuit and the motor control circuit can be simplified, to reduce the size and production cost of the printer.

Further, as shown in FIG. 6, in this embodiment the horizontal synchronizing signal having a period $D_2$ which is four times that of the period $D_1$ of the output signal of the counter 502 corresponding to the pitch of the stepping movement of the pulse motor 300 is obtained. Note, the ratio between the period $D_2$ and $D_1$ can be easily varied to control the dot pitch in the horizontal direction.

For example, when the periods $D_2$ and $D_1$ are set at values corresponding to 1/1200 inch and 1/300 inch, respectively, by providing this circuit with a separate counter which counts up half periods of the period $D_2$, and obtaining the horizontal synchronizing signal from the output of this counter, the dot pitch in the horizontal printing direction can be easily altered to 1/600 inch.

As explained above, according to this invention, since a pulse motor is used for carrying the sheet, and since the printing operation can be synchronized with the stepping movement of the pulse motor, it is possible to minimize the size of the printer and reduce the production cost thereof.

In this embodiment, the LED array used as a printing means 800 as shown in FIG. 8 consists, for example, of 2,560 units of 32 dot LED's arranged in one line perpendicular to the sheet carrying direction and completely covering the whole width of the sheet.

As mentioned above, the video data applied to all of the LED units is output from the I/O interface 420 in accordance with the horizontal synchronizing signal, and is stored in the shift register 416 through the I/O interface 418 under the control of the CPU 410.

After all the video data has been shifted into the shift register, the data is latched in a data buffer 414 by a latching signal (C) in FIG. 7 generated after the video signal has been shifted. Thereafter, the video data signals are instantly input to each LED unit, respectively, to cause a light to be emitted therefrom to form the latent image corresponding to one line of print on the surface of the photosensitive drum.

Also, in this embodiment, the input of the video data signals to each LED unit can be performed in several steps by dividing the LED array into several groups, for example, four groups $L_1$ to $L_4$, and the input of the video data signal to each LED unit carried out separately to each group, one by one, by trigger signals $STR_1$ to $STR_4$. Note, this input must be completed in the period of the horizontal synchronizing signal $D_2$.

I claim:

1. An image forming device which comprises:
   an image bearing member,
   an image forming means for forming an image on said image bearing member and provided with a plurality of dot registering devices arranged in one line, a longitudinal direction thereof being perpendicular to a direction along which said image bearing member moves, so as to cross a whole width thereof and driven in accordance with a video signal provided thereto,
   a pulse motor for feeding said image bearing member,
   a motor controller for controlling said pulse motor in accordance with a pulse supplied thereto,
   a counting means for counting a number of pulses required by said pulse motor to feed said image bearing member a distance corresponding to a lateral width of one line of said dot registering devices.
   a means for generating a video signal requiring signal to cause a video signal to be supplied to said image forming means at time intervals corresponding to said number of pulses counted by said counting means.

2. An image forming device according to claim 1, wherein said counting means comprises a counter for counting pulses supplied to said motor controller.

3. An image forming device according to claim 1, further comprising reading means for reading video signal information corresponding to said one line from a memory in which said video signal information is stored, every time said video signal requiring signal is input thereto.

4. An image forming device according to claim 1, wherein said image bearing member comprises an endless sheet photosensitive member and said image forming means comprises a precharger, a developing unit and a cleaner, each being operatively coupled to said photosensitive member.

5. An image forming device according to claim 1, wherein said image bearing member comprises a cut sheet and said image forming means comprises an electrophotographic recording device including an endless photosensitive member, a precharger, a developing unit, a cleaner and a fixing device, each being operatively coupled to said photosensitive member.

6. An image forming device according to claim 4, wherein said dot registering devices comprise Light Emitting Diodes (LED).

7. An image forming device according to claim 5, wherein said dot registering devices comprise Light Emitting Diodes (LED).

* * * * *

UNITED STATES PATENT AND TRADEMARK OFFICE
CERTIFICATE OF CORRECTION

PATENT NO. : 4,990,936

DATED : February 5, 1991

INVENTOR(S) : Hayashida

It is certified that error appears in the above-identified patent and that said Letters Patent is hereby corrected as shown below:

Title page, in the Title, change "IMAGE FORMING DEVICE" to -- IMAGE FORMING DEVICE WITH ONE LINE VIDEO SIGNALS SUPPLIED AT TIME INTERVALS CORRESPONDING TO A PULSE COUNT FOR FEEDING AN IMAGE BEARING MEMBER ONE LINE WIDTH--.

In the drawings, Sheet 3 of 8, please add reference numerals "310" and "312" to the box "CONTROLLER".

Sheet 4 of 8, (left hand drawing), change "DRIVER" to --DRIVE CIRCUIT-- and (right hand drawing) change "CPC" to --CPU-- and change "CONTROLLING" to --CONTROL--;

Sheet 8 of 8, change "VERTIAL" to --VERTICAL--.

Col. 1, line 1, change "IMAGE FORMING DEVICE" to -- IMAGE FORMING DEVICE WITH ONE LINE VIDEO SIGNALS SUPPLIED AT TIME INTERVALS CORRESPONDING TO A PULSE COUNT FOR FEEDING AN IMAGE BEARING MEMBER ONE LINE WIDTH--;

line 30, change "further since," to --further, since--;

line 58, change "sheet, the" to --sheet. Further, the--;

Col. 2, line 15, before "DESCRIPTION" insert --DETAILED--;

line 38, change "stacked, therein" to --therein. In--.

UNITED STATES PATENT AND TRADEMARK OFFICE
CERTIFICATE OF CORRECTION

PATENT NO. : 4,990,936

DATED : February 5, 1991

INVENTOR(S) : Hayashida

It is certified that error appears in the above-identified patent and that said Letters Patent is hereby corrected as shown below:

Col 4,  line 58, change "like" to --like 232. The--.

Col. 5, line 3, change "Thus" to --Thus,--;
line 38, delete "the".

Col. 6, line 14, change "414 printing" to --414. The printing--.

Col. 7, line 17, change "The-" to --The--.

Signed and Sealed this

Twenty-eighth Day of July, 1992

Attest:

DOUGLAS B. COMER

*Attesting Officer*  *Acting Commissioner of Patents and Trademarks*